Figure 1:
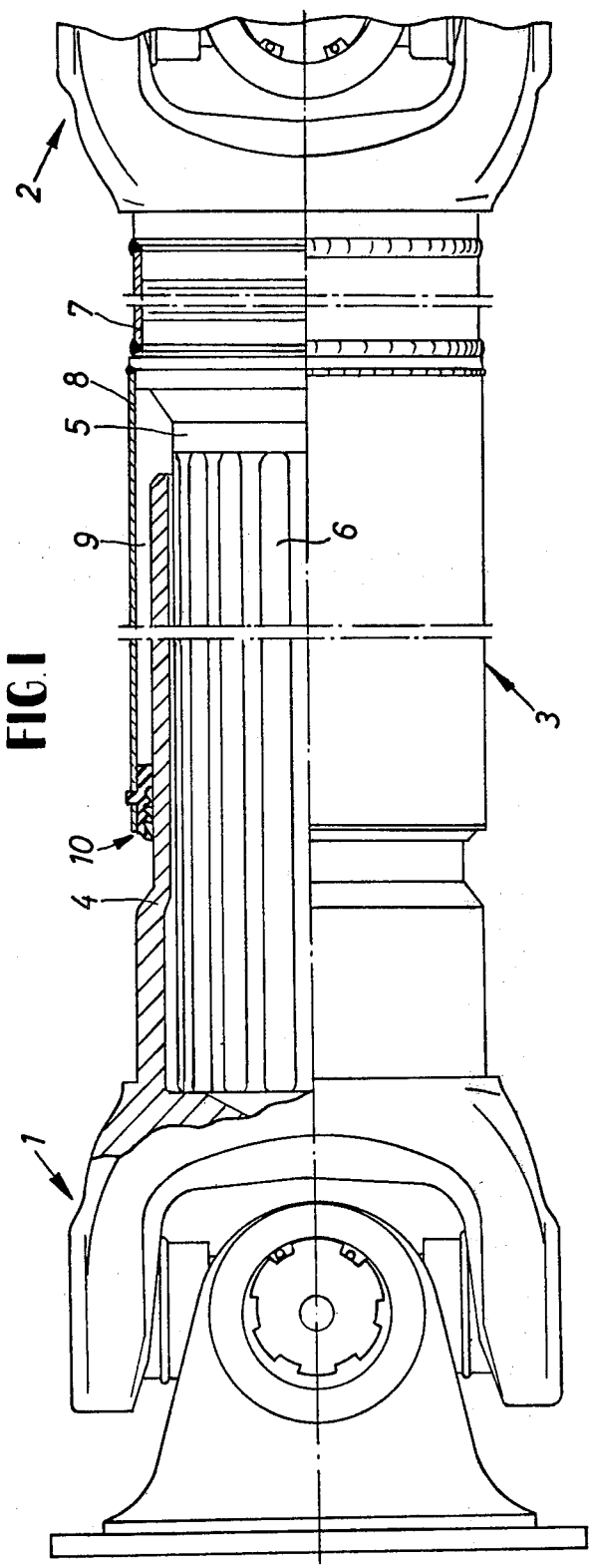

United States Patent

Schultenkämper

[11] 3,942,336
[45] Mar. 9, 1976

[54] SLIDE COUPLING FOR CARDAN JOINT SHAFTS

[75] Inventor: Josef Schultenkämper, Essen, Germany

[73] Assignee: Gelenkwellenbau GmbH, Germany

[22] Filed: Feb. 22, 1974

[21] Appl. No.: 445,308

[30] Foreign Application Priority Data
Feb. 22, 1973 Germany............................ 2308820

[52] U.S. Cl...................... 64/23; 64/32 F; 277/208
[51] Int. Cl.².......................................... F16D 3/06
[58] Field of Search .......... 64/32 F, 32 R, 23, 17 R; 277/24, 208

[56] References Cited
UNITED STATES PATENTS

| | | | |
|---|---|---|---|
| 2,116,290 | 5/1938 | Spicer | 64/23 |
| 2,307,152 | 1/1943 | Murray | 277/24 |
| 3,075,370 | 1/1963 | Kings | 64/32 |
| 3,400,558 | 9/1968 | Haines | 64/23 |
| 3,445,121 | 5/1969 | Lineker | 277/208 |
| 3,633,383 | 1/1972 | Kleinschmidt | 64/23 |

Primary Examiner—Benjamin W. Wyche
Assistant Examiner—Randall Heald
Attorney, Agent, or Firm—Hill, Gross, Simpson, Van Santen, Steadman, Chiara & Simpson

[57] ABSTRACT

Universal or Cardan joints of a power shaft are joined by an axially sliding coupling which is sealed by a combination bearing and wiper having a low coefficient of friction. One of the universal joints has an internally splined hub receiving an externally splined pin on an intermediate shaft secured to the other joint so that the axial spacing of the two joints can be varied without loss of power transmission. A sleeve or pipe secured at one end to the pin surrounds the hub and carries in its other end a plastics material sealing ring with a rigid bearing portion and a flexible lip portion riding on the hub to hold the sleeve concentrically around the hub and seal the chamber between the sleeve and hub.

12 Claims, 2 Drawing Figures

U.S. Patent   March 9, 1976   3,942,336

3,942,336

SLIDE COUPLING FOR CARDAN JOINT SHAFTS

BACKGROUND OF THE INVENTION

1. Field of the Invention

This invention relates to a sliding coupling between universal joints of a power shaft accommodating variations in axial spacings of the joints without loss of power transmission and sealing telescoped coupling components against ingress of dirt or egress of lubricant. Specifically, the invention deals with a universal or cardan joint having an internally splined hollow hub or boss portion, a second universal or Cardan joint on one end of a shaft having an externally splined pin on the other end slidable in the hub in non-rotatable relation with a tube carried by the pin surrounding the hub and having a plastics seal member riding on the hub to hold the tube in concentric relation therewith and having flexible sealing lips to retain lubricant and exclude dirt from the coupling. The hub may be coated with a low friction plastics material to facilitate sliding of the seal.

2. Prior Art

Seals for sliding couplings have heretofore accommodated radial displacement of telescope parts causing an imbalance of the seal bringing about excessive wear and friction. For example, in U.S. Pat. No. 3,633,383 issued Jan. 11, 1972 to the assignee of this application, radial movement between the splined shaft hub and the surrounding tube can occur on eccentric loading of the tube relative to the hub or on the application of bending forces on the tube. These bending forces or eccentric loads will cause elastic deformation of the tube so that the seal is heavily loaded in certain areas causing premature wear because of unequal load distribution and, of course, increasing the sliding friction

SUMMARY OF THE INVENTION

The present invention now provides a slidable coupling of a type protected by a surrounding seal which is not affected by eccentric loads and resilient or permanent deformations of a coupling housing sleeve. The coupling of this invention has a covering sleeve surrounding an internally splined hub and carried by an externally splined pin keyed in the hub with a plastics block member carried in the mouth of the sleeve riding on the hub to support the sleeve against radial shifting while accommodating free axial shifting and carrying flexible wiper lips which are free to deflect without causing undue wear. The plastics block thus acts as a supporting ring for the free end of the sleeve as well as a seal and in its preferred form, need only be inserted in the free end of the sleeve to be held by lugs projecting through holes in the sleeve and having a pair of axially spaced outwardly inclined sealing lips riding on the hub and an overlying wiper also riding on the hub to clean the hub surfaces for the sealing lips. The sealing block or ring is molded in one piece and preferably composed of plastics material such as a polyurethane, synthetic rubber, or caoutchouc. The surface of the hub on which the seal rides is preferably also coated with a low friction plastics material such as a polyamide.

It is then an object of this invention to provide a sliding coupling between two universal joints of a power shaft accommodating variations in axial spacing of the joints without loss of power and sealed by a ring supporting a coupling sleeve having axially spaced flexible sealing and wiper lips.

Another object of this invention is to provide a seal for slidable splined couplings which includes a sleeve carried by one coupling part surrounding another coupling part and supported at its free end by an inserted plastics ring riding on the other coupling part and having a series of deformable lips riding on said other coupling part.

Another object of this invention is to provide a seal for splined couplings providing a slide bearing and a lip seal.

Another object of this invention is to provide a slidable splined coupling with a protecting sleeve projecting from one coupling part over the other coupling part and carrying a seal which also acts as a bearing supporting the sleeve on the other coupling part.

A specific object of the invention is to provide a plastics material combining bearing and lip seal for slidable couplings.

Other and further objects of this invention will be apparent to those skilled in this art from the following description of the annexed sheet of drawings which, by way of a preferred example only, illustrates one embodiment of the invention.

IN THE DRAWINGS

Figure 2:
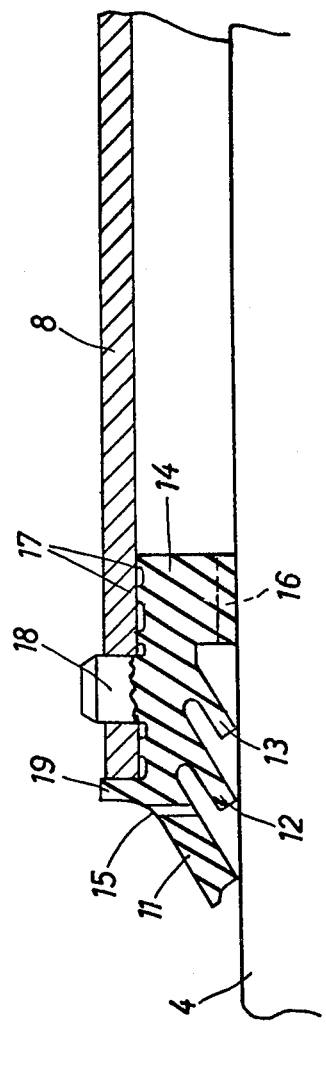

FIG. 1 is a side elevational view, partially in longitudinal section, of a drive shaft with a slidable coupling according to this invention; and FIG. 2 is an enlarged fragmental longitudinal sectional view of the slide coupling illustrating the details of the coupling seal.

AS SHOWN ON THE DRAWINGS

In FIG. 1 the reference numerals 1 and 2 designate generally two Cardan or universal joints in a power shaft assembly including an intermediate shaft 3. This intermediate shaft 3 consists of an internally splined cylindrical hub or boss 4 extending from the joint 1, an externally splined shaft pin 5 with circumferentially spaced longitudinally extending spline teeth 6 slidably meshed with the internal teeth of the hub 4 and a tubular shaft 7 of desired length welded at one end to the pin 5 and at the other end to the joint 2. Thus, the Cardan shaft ends 1 and 2 of the power shaft can move axially toward and away from each other by sliding of the pin 5 in the hub 4 but cannot rotate relative to each other because of the meshed engagement of the spline teeth 6 of the pin 5 with the internal teeth of the hub 4.

A sleeve or pipe 8 is welded to the axial inner end of the pin 5 and is of large enough diameter to surround the hub 4 in spaced relation providing a chamber 9 around the hub and pin components of the coupling.

The chamber 9 is sealed by a plastics material ring block 10 mounted in the free end or mouth of the sleeve 8 and slidable on the hub 4.

As best shown in FIG. 2, the ring block 10 has a radially inward projecting, somewhat flexible wiper flange 11 at the axial outer end thereof, a pair of axially spaced radially inwardly extending more flexible sealing lips 12 and 13 intermediate its ends and a thick relatively stiff bearing ring or block portion 14 at its inner axial end. This bearing block portion 14 rides on the tubular hub 4 and supports the free end of the sleeve 8 in concentric relation around the hub. The wiper flange 11 and the sealing lips 12 and 13 have inner peripheries of smaller diameter than the hub 4 so as to be deflected to the inclined operative positions shown in FIG. 2 when riding on the hub. As also shown in FIG. 2, the wiping flange 11 is thicker and therefore more rigid than the sealing lips 12 and 13.

The flange 11, lips 12 and 13, and bearing block 14 are axially spaced to provide grooves therebetween and the groove between the flange 11 and outer lip 12 is vented to the atmosphere by one or more bleed holes 15 thus providing for the drying out of any moisture trapped between the flange 11 and outer sealing lip 12. The flange 11 acts as a scraper or wiper cleaning the hub 4 in advance of the sealing lips 12 and 13 so that these lips will have a clean surface on which to ride and effectively seal.

The bearing block end 14 of the seal has one or more longitudinal grooves 16 in its inner periphery providing channels venting the chamber 9 with the groove between the bearing and the inner sealing lip 13. A lubricant in the chamber 9 can thus be fed to the sealing lip 13 and pressures in excess of atmospheric pressure in this chamber 9 can be relieved since the lips 12 and 13 will be raised off of the hub 4, permitting air to escape to the vent holes 15. Conversely, external pressures greater than the pressure in the chamber 9 will act through the vent holes 15 to more tightly press the lips 12 and 13 against the hub 4.

The outer periphery of the seal ring 10 has a series of axially spaced radially projecting beads 17 separated by annular grooves and adapted to be radially deformed to provide a tight press fit of the seal ring 10 in the free end or mouth of the sleeve 8.

To prevent rotation of the seal 10 and the sleeve 8 and to further lock it to the sleeve, one or more radial projecting lugs or pins 18 integral with the bearing ring 10 are provided intermediate the ends of the ring to seat in correspondingly shaped radial holes in the sleeve 8.

The seal ring 10 is also provided with an integral peripheral collar or shoulder 19 bottomed against the end face of the sleeve 8.

The seal 10 is formed in one piece and is composed of a plastics material rigid enough to provide a good bearing support for the sleeve 8 and flexible enough to accommodating flexing of the sealing lips 12 and 13 into good sealing engagement with the hub 4. Plastics materials such as polyurethane, synthetic rubber or natural rubber are useful.

In addition, it is preferred that the peripheral surface of the hub 4 on which the seal ring 10 rides, be coated with a low friction plastics material such as a polyamide resin.

From the above descriptions it will be understood that the power shaft of this invention has an efficiently sealed sliding splined coupling accommodating variations in axial spacing of power transmitting Cardan or universal joints without accommodating relative rotation between the splined together sections of the shaft. The splined coupling joining the shaft sections has a protecting cover or sleeve which is adequately supported at its free end by the seal ring of this invention in such a manner so that if the sleeve should be cocked, bent, or otherwise deflected, it will not unevenly load the seal, cause any damage to the seal, or create any excessive wear conditions for the seal. The seal is composed of low friction plastics material to accomodate free axial movement of the spline components.

I claim as my invention:

1. A power shaft having univeral joints adapted to move toward and away from each other without accommodating relative rotation therebetween which comprises a first universal joint having a hollow internally splined cylindrical hub projecting therefrom, a second universal joint, an externally splined pin extending from said second universal joint into said hollow hub in splined connected engagement therewith, a sleeve rigidly secured on and supported by the axial inner end of said pin enveloping said hub in radially spaced relation therewith having a free end intermediate the ends of the hub and defining a chamber surrounding the hub and pin, a bearing and seal combination anchored directly to the sleeve in the mouth of free end of said sleeve and having a stiff bearing ring riding on said hub to hold the sleeve in concentric relation with the hub and a flexible sealing ring axially outward from said bearing ring riding on the hub to seal the chamber between the sleeve and hub, and said pin and hub adapted to slide axially relative to each other but held against relative rotation by the splined teeth thereof.

2. A spline coupling for power shafts which comprises a first Cardan Joint having a tubular internally splined hub extending axially therefrom, a second Cardan Joint having an externally splined pin extending axially therefrom inserted in said hub in nonrotatable slidable relation, a rigid sleeve fixedly secured at one end to said pin having a free end surrounding said hub in spaced relation therefrom, a seal ring combination anchored near the free end of said sleeve and having a stiff bearing ring riding on said hub to hold the sleeve in concentric relation with the hub and a flexible sealing ring riding on said hub to seal the space between the sleeve and hub.

3. A slide coupling for power shafts which comprises a first internally splined coupling part, a second externally splined coupling part in toothed engagement with the first part, a protecting sleeve fixedly secured at one end on said second part projecting around said first part in spaced relation providing a chamber therebetween having a free opposite end, and a combination plastics material bearing and seal ring carried by the free end of said sleeve having a rigid first ring portion riding on the first part to hold the sleeve in spaced relation around the first part and a flexible second ring portion forming a seal for the chamber between the first part and sleeve.

4. The power shaft of claim 1 wherein the seal ring is a one-piece molded plastic block with a stiff bearing portion at one end, a flexible wiper flange on the other end, and flexible sealing lip means between said ends.

5. The power shaft of claim 1 wherein the sealing ring has a thick rigid bearing portion and a plurality of radially projecting flexible lip portions spaced axially from said bearing portion and from each other.

6. The coupling of claim 2 wherein the seal ring is locked in the mouth of the sleeve with radially projecting lugs seated in holes in the sleeve.

7. The coupling of claim 2 wherein the portion of the hub on which the seal rides has a low friction coating.

8. The coupling of claim 3 wherein the seal ring has a stiff rigid bearing block portion at one axial end thereof, a semi-rigid wiper flange portion at the other axial end thereof, and a pair of flexible lips between said end portions.

9. The seal ring of claim 8 wherein the bearing portion has a channel therethrough venting an adjacent sealing lip with the end of the bearing ring.

10. The seal ring of claim 8 wherein the wiper flange has a bleed hole therethrough.

11. The coupling of claim 3 wherein the seal ring has peripheral radially raised beads adapted to be flattened in the sleeve to provide a tight seal pressed fit with the sleeve.

12. The seal ring of claim 11 wherein a collar is provided on the axial outer end bottomed against the end of the sleeve.

* * * * *